E. J. FORNEY.
SUBSOIL ATTACHMENT FOR PLOWS.
APPLICATION FILED MAY 16, 1914.
1,122,269.
Patented Dec. 29, 1914.
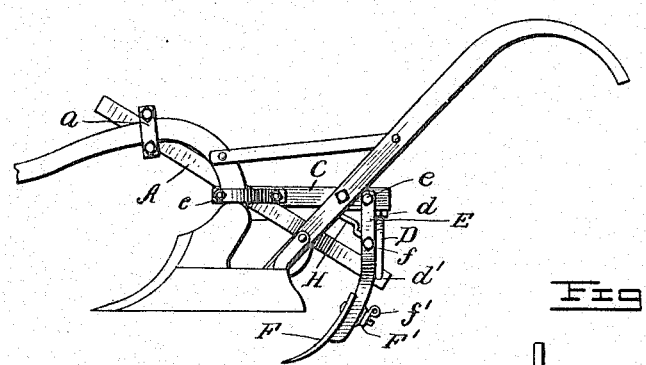
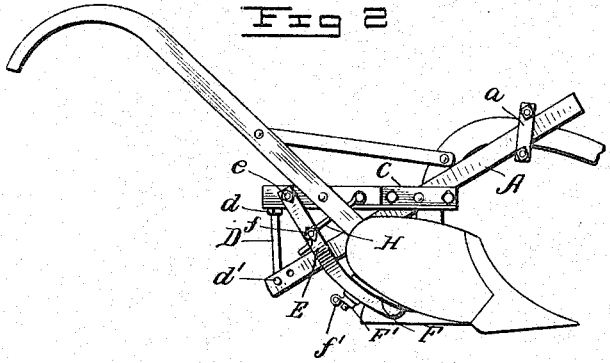
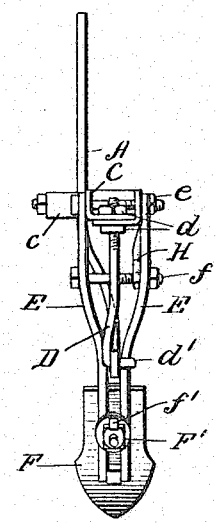
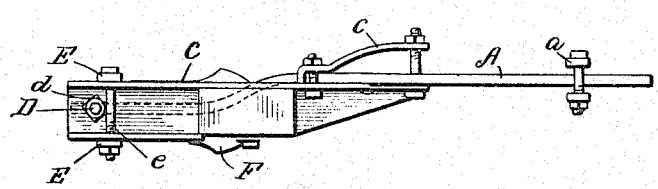
Witnesses
Halbert P. Brown
Thomas Durant
Inventor
Edward J. Forney
By Church & Church
his Attorneys

UNITED STATES PATENT OFFICE.

EDWARD J. FORNEY, OF GREENSBORO, NORTH CAROLINA.

SUBSOIL ATTACHMENT FOR PLOWS.

1,122,269.  Specification of Letters Patent.  Patented Dec. 29, 1914.

Application filed May 16, 1914. Serial No. 839,009.

*To all whom it may concern:*

Be it known that I, EDWARD J. FORNEY, a citizen of the United States, residing at Greensboro, in the county of Guilford and State of North Carolina, have invented certain new and useful Improvements in Subsoil Attachments for Plows; and I do hereby declare the following to be a full, clear, and exact description of the same, reference being had to the accompanying drawings, forming part of this specification, and to the figures and letters of reference marked thereon.

The objects of the present invention are to provide a convenient, cheap and effective means whereby a plow of usual construction embodying a mold-board and landside may be adapted for subsoiling either as an operation performed simultaneously with the operation of furrow turning, or as an operation succeeding the operation of furrow turning.

A further object is to provide a subsoiling attachment for ordinary turn-over plows which may be quickly and easily adjusted or set to operative subsoiling position, or, when so desired, readily folded out of the way to permit the plow to be operated as a simple turn-over plow in the ordinary way.

The invention consists in certain novel details of construction and combinations and arrangements of parts all as will be now described and pointed out particularly in the appended claims.

Referring to the accompanying drawings, Figure 1 is a side elevation of a plow having the present invention thereon, the subsoiling share being down in working position. Fig. 2 is a similar view looking at the opposite side of the plow, with the subsoiling share in elevated or folded position. Fig. 3 is a rear elevation; and Fig. 4 is a plan view of the attachment separate from the plow.

Like letters of reference in the several figures indicate the same parts.

The attachment of the present invention embodies in its construction a frame which is adapted to be clamped or otherwise securely fastened to the plow beam of an ordinary plow and to form the support and brace for a movable subsoiling share or shovel which will normally occupy a position behind and above the bottom level of the mold board and landside of the plow, but which is adapted to swing down into operative position where it will project below the bottom level of said parts for effectually breaking and lightening the soil in the bottom of the furrow.

As shown in the accompanying drawing, which is a preferred construction, the frame embodies a bar A adapted to be attached at its forward end to the beam of the plow, as by a clip $a$. Said bar, when in position on the plow, occupies an inclined position with its rear end down behind the plow body and preferably projecting through between the lower portions of the handles. The other portion of the frame is formed by an angle iron C securely fastened to an intermediate portion of the bar A and adapted to occupy a substantially horizontal position projecting rearwardly from the plow beam and it is conveniently secured at its forward end to said beam by a clip $c$, although, as will be readily understood, other fastening means may be employed. The clip $c$ not only secures the part C to the beam, but also operates to clamp the intermediate portion of the bar A so that the two parts of the frame are held firmly in position, and in order to give additional rigidity with some capacity for adjustment of the angular relation of the parts, they are connected at the rear end by an adjustable connection in the form of a long bolt D, the upper end of which is adjustably held in the angle iron C, by clamping nuts $d$, and the lower end of which is bent at substantially right angles and projected through one or the other of a plurality of openings in the end of the bar A, as at $d'$.

The angle iron portion C of the frame at its rear end, is provided with a transverse bearing for a through-bolt $e$ which constitutes a pivotal support for the standard of the subsoiling share or shoe. This standard is preferably formed of relatively heavy bar metal with its upper portion bifurcated to form arms E so as to embrace the part C of the frame, while the bar A projects through between the said arms. The lower portion of the standard below the bar A is curved forwardly to form a rigid seat for the share or shoe F of the subsoiling attachment. To give rigidity to the standard it is preferably braced by cross bolts and rivets *f* and the share or shoe is held in place by a bolt having a clamping nut F' on its rear end provided with a tubular finger piece *f'* adapted for the reception of a rod or other implement whereby the nut may be turned for adjustment or removal of the share. The two sides of the standard formed by the lower portion of the arms E are slightly separated for the admission of the share holding bolt, and this construction provides a convenient means whereby the share may be adjusted vertically so as to vary to a considerable degree the depth of the subsoiling.

The standard for the subsoiling attachment, as before stated, is pivotally connected at its upper end with the frame and is adapted to swing from its elevated or folded position shown in Fig. 2, down to its extended or lowered position shown in Fig. 1. When in the latter position it is subject to considerable strain but it is supported and braced at a point well below its pivotal attachment by the transversely extending end *d'* of the bolt D, or if so desired, a transverse bolt or pin of any suitable character may be located in one of the holes in the rear end of the bar A to accomplish the same result. The provision of a plurality of holes in the bar A permits of a variation in the angular position of the standard and its share, so that it may be set to draw into the ground to a greater or less degree as desired by the plowman.

For holding the subsoiling standard and its share in elevated or folded position, a catch H is pivotally mounted on the frame in position, to coöperate with one of the cross bolts in the standard when the latter is swung up into its folded or elevated position, and the rear end of this catch is projected a sufficient distance so that it may be readily lifted by the foot of the plowman when it is desired to release the subsoiling device, although the weight of the catch will hold it in engaging position with ample security until it is intentionally released as aforesaid.

Obviously, the particular style and construction of the framework of the subsoiling attachment may be varied and adapted for connection with plows of various types and styles, but in each instance it is preferable to have the frame offset laterally with respect to the longitudinal axis of the beam so as to bring the subsoiling share into the proper line of drift and to prevent the subsoiling share from working too closely to the landside of the furrow where it would meet with heavy resistance and possibly tend to cause the plow to drift into the previously formed furrow.

In operation, the subsoiling device may be used simultaneously with the mold board so that a furrow will be turned and the subsoiling accomplished simultaneously, but by properly setting the parts it is entirely practical to use the subsoiling device without turning a furrow.

With the present device the subsoiler may be thrown into and out of operation almost without effort on the part of the plowman, a simple dragging of the plow rearwardly by the handles will ordinarily lift the subsoiling share and standard high enough for the catch to engage the same and when it is desired to throw it into operation the catch may be disengaged by kicking the same upwardly and allowing the subsoiler to drop down to operative position.

Having thus described my invention, what I claim as new and desire to secure by Letters Patent of the United States, is:

1. A subsoil attachment for plows embodying a frame having means at its forward end for attachment to a plow beam, a subsoiling standard and share pivotally connected at the upper end to the frame at a point in rear of the mold board and landside and projecting below the frame in position to lie in rear of the mold-board and landside of the plow when in operative position and to swing upwardly and forwardly into the space between and in rear of the mold-board and landside when in inoperative position, and an automatic catch coöperating with said standard for retaining the standard and share in its inoperative position.

2. A subsoiling attachment for plows embodying a frame formed of substantially horizontal and diagonal members arranged in a vertical plane and connected together at their forward ends with means for attaching said frame to a plow beam, the frame being offset laterally with respect to the longitudinal axis of the beam, a subsoiling standard pivotally connected with the substantially horizontal member of the frame at a point in rear of the mold board and landside to swing in the plane of the frame and a stop on the horizontal member of the frame for limiting the downward and rearward movement of the standard.

3. A subsoiling attachment for plows embodying a bar having means at its forward end for attachment to a plow beam with the bar inclined downwardly and rearwardly, a substantially horizontal member connected with said bar, a downwardly extending subsoiling standard pivotally connected at its upper end with the horizontal member of the frame, and embracing the inclined bar, a stop on the horizontal bar for limiting the rearward movement of the standard, a catch for holding the standard in its forward position, and a subsoiling share mounted on the lower end of the standard.

EDWARD J. FORNEY.

Witnesses:
W. C. SMITH.
WM. C. A. HAMMEL.

Copies of this patent may be obtained for five cents each, by addressing the "Commissioner of Patents, Washington, D. C."